US 6,529,708 B1

(12) United States Patent
Larsson et al.

(10) Patent No.: US 6,529,708 B1
(45) Date of Patent: Mar. 4, 2003

(54) EFFICIENT DETERMINATION OF TIME OF ARRIVAL OF RADIO COMMUNICATION BURSTS

(75) Inventors: Erik Larsson, Kista (SE); Ari Kangas, Uppsala (SE); Sven Fischer, Nürnberg (DE)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/354,175

(22) Filed: Jul. 16, 1999

(51) Int. Cl.[7] ............................................. H04B 17/00
(52) U.S. Cl. ..................................... 455/67.6; 465/456
(58) Field of Search ............................. 455/436, 457, 455/423, 67.3, 67.4, 506, 501, 561, 67.6; 342/386, 417–420; 340/988–994

(56) References Cited

U.S. PATENT DOCUMENTS

| | | | |
|---|---|---|---|
| 5,930,248 A | * 7/1999 | Langlet et al. ............. | 370/347 |
| 5,953,649 A | * 9/1999 | Junell ........................ | 455/404 |
| 6,009,334 A | * 12/1999 | Grubeck et al. ............ | 455/456 |
| 6,064,888 A | * 5/2000 | Lundqvist et al. .......... | 455/456 |
| 6,084,862 A | * 7/2000 | Bjork et al. ................ | 370/292 |
| 6,097,959 A | * 8/2000 | Yost et al. .................. | 455/456 |
| 6,108,558 A | * 8/2000 | Vanderspool, II .......... | 455/456 |
| 6,191,738 B1 | * 2/2001 | Pfeil et al. .................. | 342/457 |
| 6,246,884 B1 | * 6/2001 | Karmi et al. ............... | 455/521 |
| 6,272,350 B1 | * 8/2001 | Tekinay ..................... | 455/506 |

FOREIGN PATENT DOCUMENTS

| WO | 9927738 | 6/1999 | ............ H04Q/7/38 |
|---|---|---|---|
| WO | 9927739 | 6/1999 | ............ H04Q/7/38 |

OTHER PUBLICATIONS

Ninth IEEE International Symposium on Personal, Indoor and Mobile Radio Communications (Cat. No. 98TH8361), Proceedings of Ninth International Symposium on Personal, Indoor, and Mobile Radio Communications (PIMRC'98), "*Time of Arrival Estimation of Narrowband TDMA Signals for Mobile Positioning*", S. Fischer et al., Boston, MA, Sep. 1998, 1998, New York, NY, IEEE USA, vol. 1, pp. 451–455, XP002125582, ISBN: 0–7803–4872–9.

* cited by examiner

Primary Examiner—Edward F. Urban
Assistant Examiner—Charles Craver
(74) Attorney, Agent, or Firm—Jenkens & Gilchrist, A Professional Corporation

(57) ABSTRACT

The propagation time for propagation of a radio signal from a radio transmitting station to a radio receiving station is estimated based on calculated correlation values, calculated energy values and a known energy value. The receiving station receives a series of received signals that respectively correspond to radio signaling bursts transmitted by the radio transmitting station. Each of the radio signaling bursts includes a known signaling sequence. The calculated correlation values are indicative of correlations between the received signals and the known sequence, the calculated energy values are calculated for the respective received signals, and the known energy value is the energy of the known sequence.

24 Claims, 7 Drawing Sheets

I = 10

I = 50

EFFICIENT DETERMINATION OF TIME OF ARRIVAL OF RADIO COMMUNICATION BURSTS

REFERENCE TO PRIORITY APPLICATION

The present application for patent hereby claims priority from, and incorporates by reference the subject matter disclosed in, U.S. patent application Ser. No. 08/978,960 filed Nov. 26, 1997, issued as U.S. Pat. No. 6,009,334 on Dec. 28, 1999, entitled "Method and System for Determining Position of Mobile Radio Terminals."

FIELD OF THE INVENTION

The invention relates generally to locating the position of a mobile radio communication unit and, more particularly, to radio signal time of arrival measurements.

BACKGROUND OF THE INVENTION

The ability to locate the position of a mobile radio communication unit provides many well known advantages. Exemplary uses of such position locating capability include security applications, emergency response applications, and travel guidance applications. Conventional techniques for providing position locating capability include time of arrival (TOA) and time difference of arrival (TDOA) techniques.

Referring to FIG. 1, if a radio receiving station 11 can determine the time that a radio signal, transmitted at a predetermined time by a radio transmitting station 13, arrives at the receiving station 11, this arrival time can be used in conventional TOA and TDOA applications. Because the time of transmission is known, the arrival time can be determined, for example, by determining the propagation time associated with the radio communication channel 15 between the two stations. This propagation time can then be multiplied by the speed of light to produce an estimate of the geometric distance between the two stations. If a plurality of fixed-site receiving stations measure the respective times of arrival of a signal transmitted by a mobile transmitting station, or if a mobile receiving station measures the times of arrival of a plurality of signals respectively transmitted by a plurality of fixed-site transmitting stations, then the respective distances from the mobile station. to plural fixed-site stations can be determined and used in conventional fashion to estimate the location of the mobile station.

As an example, an uplink time of arrival measurement approach will now be described with respect to the Global System for Mobile Communication (GSM), which is exemplary of a wireless communication system in which uplink time of arrival techniques are applicable. When an external application (or the GSM network itself) decides to locate the position of a mobile unit (also referred to as mobile station), a Mobile Location Center forces (via a base station controller) the mobile unit to perform a conventional asynchronous handover, whereupon the mobile unit transmits up to 70 uplink access bursts, one burst per TDMA frame (i.e., one burst every 8 time slots). The mobile unit transmits the access bursts in an attempt to comply with the asynchronous handover command.

The Mobile Location Center (MLC) orders a number of Location Measurement Units (LMUs) to capture the access bursts and measure the time of arrival of each burst at each LMU. The LMUs then provide the MLC with their time of arrival measurements and reliability estimates for these measurements. In order to compute the position of the mobile station, the MLC uses the time of arrival values and corresponding reliability parameters, the geographic location coordinates of the LMUs, and information regarding time differences among the respective internal time bases of the LMUs. For example, each LMU can be provided with an absolute time reference (e.g., a Global Positioning System (GPS) clock), in which case the LMUs are all synchronized together, so that relative time differences among the LMUs are not a factor in the MLC's calculation of the position of the mobile station.

Normally, the bursts contain two parts, one part that is a known sequence, often referred to as a training sequence, and one part that contains data that is unknown to the recipient. Noise, interference and multipath propagation are the main problems when estimating the TOA of a set of bursts. In the case when the signal-to-noise-and-interference ratio (SNIR) is high, and multipath propagation consequently is the main difficulty, a variety of techniques exist to address the TOA estimation problem. The opposite case is when the SNIR is very low. In this case, the effects of multipath propagation are often neglected and all efforts are concentrated on "finding" the bursts, i.e., estimating TOA with an accuracy in the order of 0.5-1 symbol interval. This is sometimes referred to as training sequence detection or burst synchronization.

It is desirable to provide for TOA estimation that can operate both under high and low SNIR. The present invention particularly addresses the TOA estimation problem under low SNIR, i.e., the detection problem.

Consider I bursts transmitted on a channel, each burst containing the same finite sequence s(t) of known bits (e.g., a training sequence), together with other bits that are not known to the receiver. The bursts are delayed between transmitter and receiver by a propagation time $\Delta$ which, as mentioned above, is the goal to determine. Denote by $x_i(t)$ the received signal for a given burst i, where t is (continuous) time. All functions described herein will be in continuous time for simplicity. Since the considered signals normally are bandlimited, analogous digital processing of sampled values can be done instead according to the Nyquist theorem, as will be apparent to workers in the art.

If time dispersion is neglected the received signal can be modeled as $$x_i(t) = \alpha_i s(t-\Delta) + m_i(t) \qquad \text{Equation 1}$$

where $\alpha_i$ is the received signal amplitude of burst i, which amplitude is varying because the channel is fading. The term $m_i(t)$ is the sum of noise and interference for burst i. In a cellular system the interference comes from users in other cells transmitting on the same frequency. The noise power $E[|m_i(t)|^2]$ is normally varying strongly between the bursts, so the noise is nonstationary. This can occur, for example, because the interferer signal is fading or because of frequency hopping in the system. Within a burst however, the noise is often considered as white and stationary.

The state of the art algorithm for estimating $\Delta$ is called incoherent integration (ICI), described for example in U.S. Ser. No. 08/978,960 filed on Nov. 26, 1997, hereby incorporated herein by reference. Essentially, the algorithm works as follows. Define $$c_i(\Delta) = \int s(t-\Delta) x_i^*(t) dt \qquad \text{Equation 2}$$

which is the correlation result between the received signal $x_i(t)$ associated with burst i and the known sequence s(t). If SNIR is low, $C_i(\Delta)$ has multiple peaks which are shown in the graph of $|C_i(\Delta)|^2$ in FIG. 2. Compute $$g(\Delta) = \sum_{i=1}^{I} |c_i(\Delta)|^2 \qquad \text{Equation 3}$$

and pick the $\Delta^*$ (i.e., the value of $\Delta$) that maximizes $g(\Delta)$. FIGS. 3 and 4 show examples of $g(\Delta)$ for I=10 and I=50, respectively. ICI performs relatively poorly under interference (nonstationary noise) conditions.

A variation of ICI is weighted ICI which works as follows. Let $$g_w(\Delta) = \sum_{i=1}^{I} w_i |c_i(\Delta)|^2 \qquad \text{Equation 4}$$

and pick the $\Delta^*$ that maximizes $g_w(\Delta)$. The $w_i$ are weight factors designed, for example, to amplify bursts having high SNIR and suppress bursts having low SNIR. This makes the peaks more visible than with Equation 3, as shown by comparing FIGS. 3 and 4 to FIGS. 5 (I=10) and 6 (I=50). The calculation of the weight factors is quite complicated. The optimal weight factors depend on the SNIR for the associated bursts, but the SNIR cannot be estimated until $\Delta^*$ is known (or has been estimated). Thus, when using Equation 4, $\Delta^*$ is needed to estimate $\Delta^*$. One way to address this problem is to make an a priori estimate of $\Delta^*$, and use it to determine the weight factors $w_i$. However, such an a priori estimate can often disadvantageously deviate several symbol intervals from the correct value. Moreover, weighted ICI also requires collecting and storing all of the received signals $x_i(t)$ before evaluation of Equation 4 above, which is a disadvantageous restriction in many applications, for example, in mobile radio receivers where storage capacity is typically limited.

Although weighted ICI performs acceptably under nonstationary noise (interference) conditions, it performs poorly in stationary white noise.

It is desirable in view of the foregoing to provide for burst detection with improved performance in both stationary and nonstationary noise, and which does not require significant data storage capacity. The present invention provides such burst detection capability by implementing an accumulated logarithm function, based on the correlation between the transmitted and received signals and also on the energies of those signals, to estimate the burst propagation delay.

DETAILED DESCRIPTION

According to embodiments of the invention, the propagation time for propagation of a radio signal from a radio transmitting station to a radio receiving station can be estimated based on calculated correlation values, calculated energy values and a known energy value. As discussed above, the receiving station receives a series of received signals that respectively correspond to radio signaling bursts transmitted by the radio transmitting station. Each of the radio signaling bursts includes a known signaling sequence. The aforementioned calculated correlation values are indicative of correlations between the received signals and the known sequence, the aforementioned calculated energy values are calculated for the respective received signals, and the aforementioned known energy value is the energy of the known sequence.

According to exemplary embodiments of the invention, the following equation can be used to estimate the propagation time $\Delta$:

$$g_{\log}(\Delta) = \sum_{i=1}^{I} f_i(\Delta) = \sum_{i=1}^{I} \log(E_s E'_{xi} - |c_i(\Delta)|^2) \qquad \text{Equation 5}$$

where $E_s$ is the energy of the known transmitted sequence $s(t)$, $$E_s = \int |s(t)|^2 dt,$$

and $E_{xi}$ is the energy of the received signal $x_i(t)$, $$E_{xi} = \int |x_i(t)|^2 dt.$$

The $g_{log}(\Delta)$ function is relatively straightforward and simple to calculate. For example, the logarithm can be implemented using a lookup table as is well known in the art. Moreover, as each signal $x_i$ is received, the corresponding logarithm can be calculated and then simply added to the existing sum of logarithms associated with previously received signals $x_i$. Thus, the $g_{log}$ measure can be implemented without storing any of the previously received signals $x_i$, thus minimizing the need for data storage. This is particularly important when the $g_{log}$ measure is being implemented by a mobile receiving station, where data storage capacity is limited.

Figure 7:
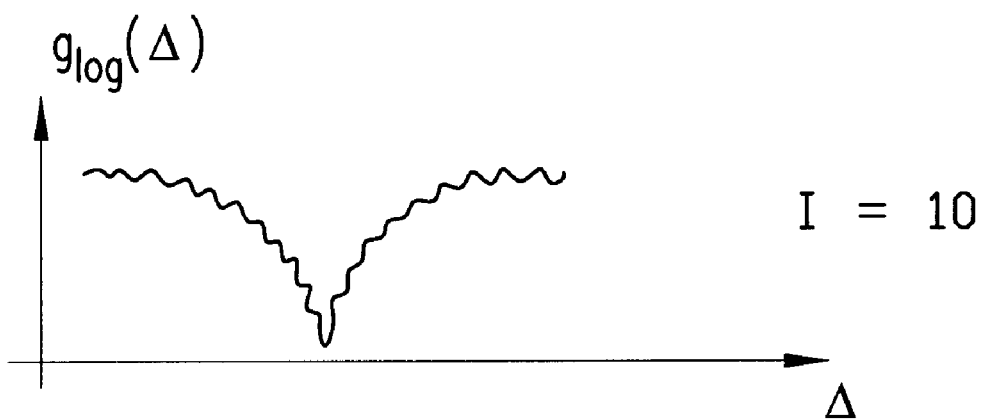
FIGS. 7 and 8 graphically illustrate exemplary techniques according to the invention for estimating radio propagation time between a radio transmitting station and a radio receiving station.
Figure 8:
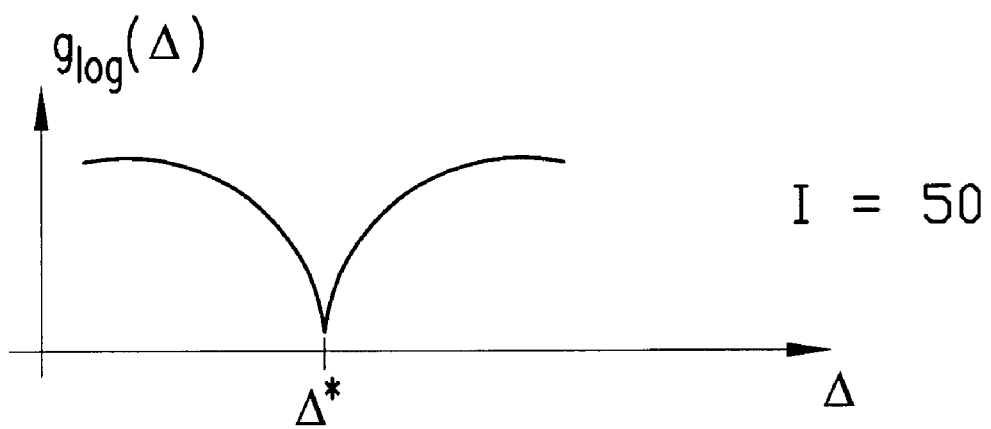

FIGS. 7 and 8 graphically illustrate the $g_{log}$ measure of Equation 5. In the example of FIG. 7, 10 bursts were used (I=10), and in the example of FIG. 8, 50 bursts were used (I=50). As shown in FIG. 8, the value of $\Delta$ that produces the smallest value of $g_{log}$ is selected as the propagation time between the transmitting and receiving stations. In FIG. 8, the value of $\Delta$ that minimizes $g_{log}$ is designated as $\Delta^*$.

It is shown in the Appendix that the value $\Delta^*$ that minimizes $g_{log}(\Delta)$ is the maximum likelihood estimate of $\Delta$ under some (quite general) conditions.

Figure 1:
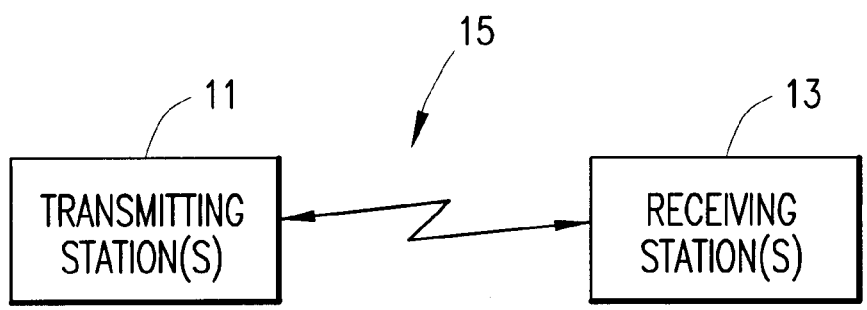
FIG. 1 illustrates diagrammatically an exemplary communication system in which the present invention can be implemented.
Figure 9:
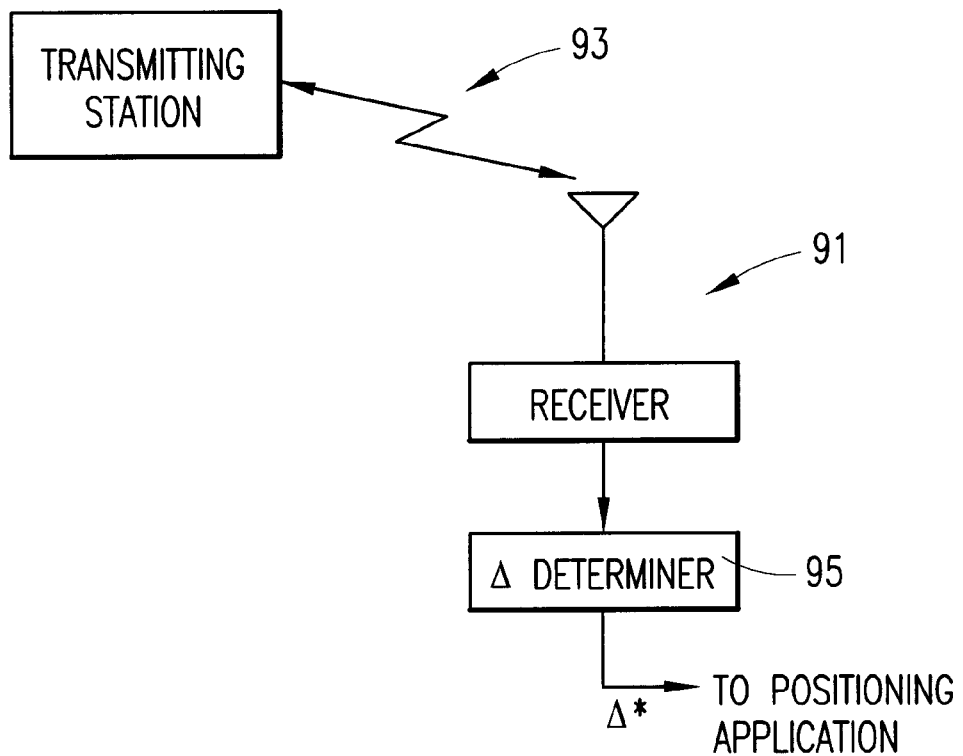
FIG. 9 illustrates pertinent portions of an exemplary embodiment of a radio receiving station according to the invention.
Figure 2:
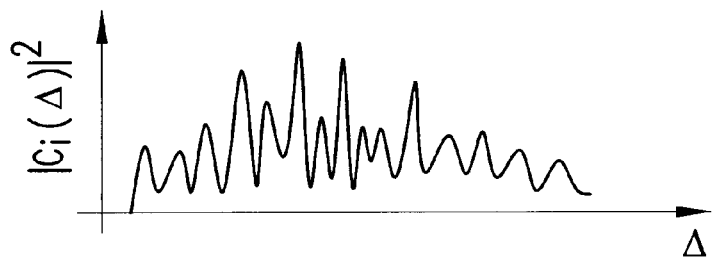
FIG. 2 graphically illustrates a prior art correlation function.
Figure 3:
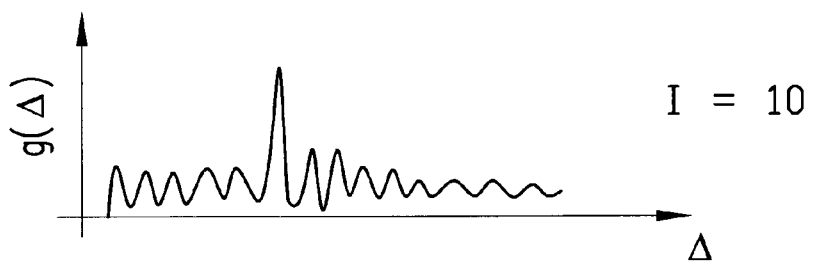
FIGS. 3 and 4 graphically illustrate examples of prior art incoherent integration (ICI) results.
Figure 4:
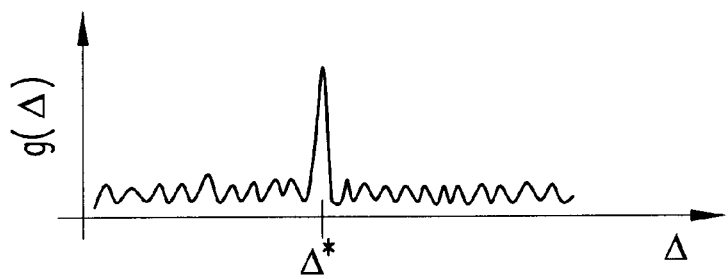
Figure 5:
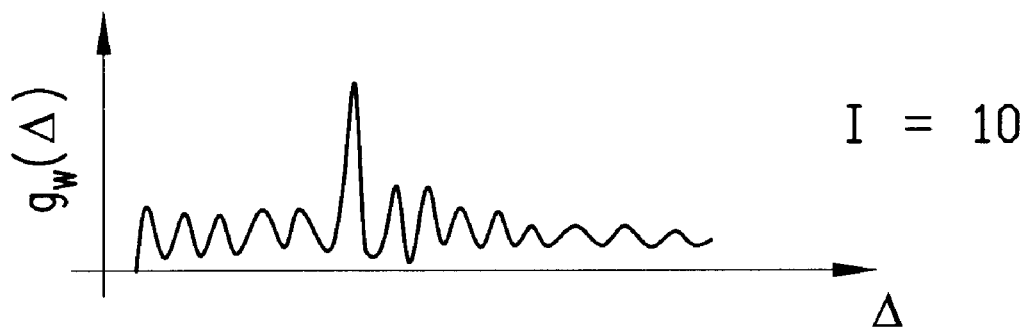
FIGS. 5 and 6 graphically illustrate examples of prior art weighted ICI results.
Figure 6:
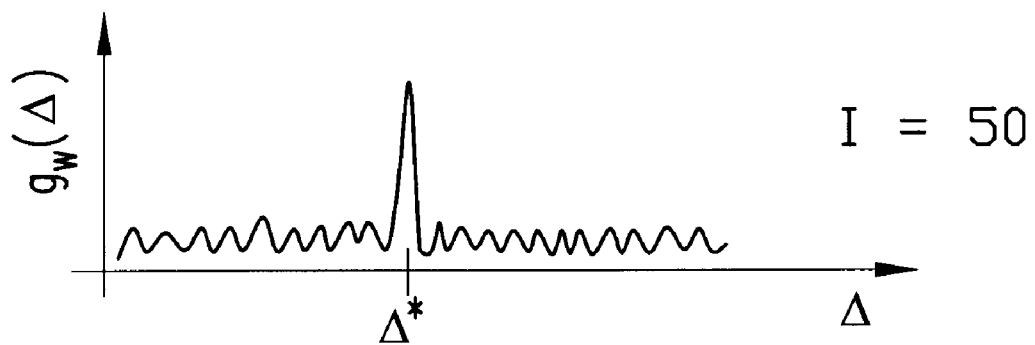

FIG. 9 illustrates pertinent portions of an exemplary embodiment of a radio receiving station (such as shown in FIG. 1) according to the invention. In the receiving station of FIG. 9, a conventional radio receiver apparatus at 91 receives radio signals from a transmitting station via a radio communication channel 93. The receiver apparatus 91 can utilize conventional techniques to produce the received signal $x_i$ corresponding to transmitted burst i from the transmitting station. This received signal $x_i$ is input to a determiner 95 which implements Equation 5 to produce $\Delta^*$ for use in any desired positioning application.

Figure 10:
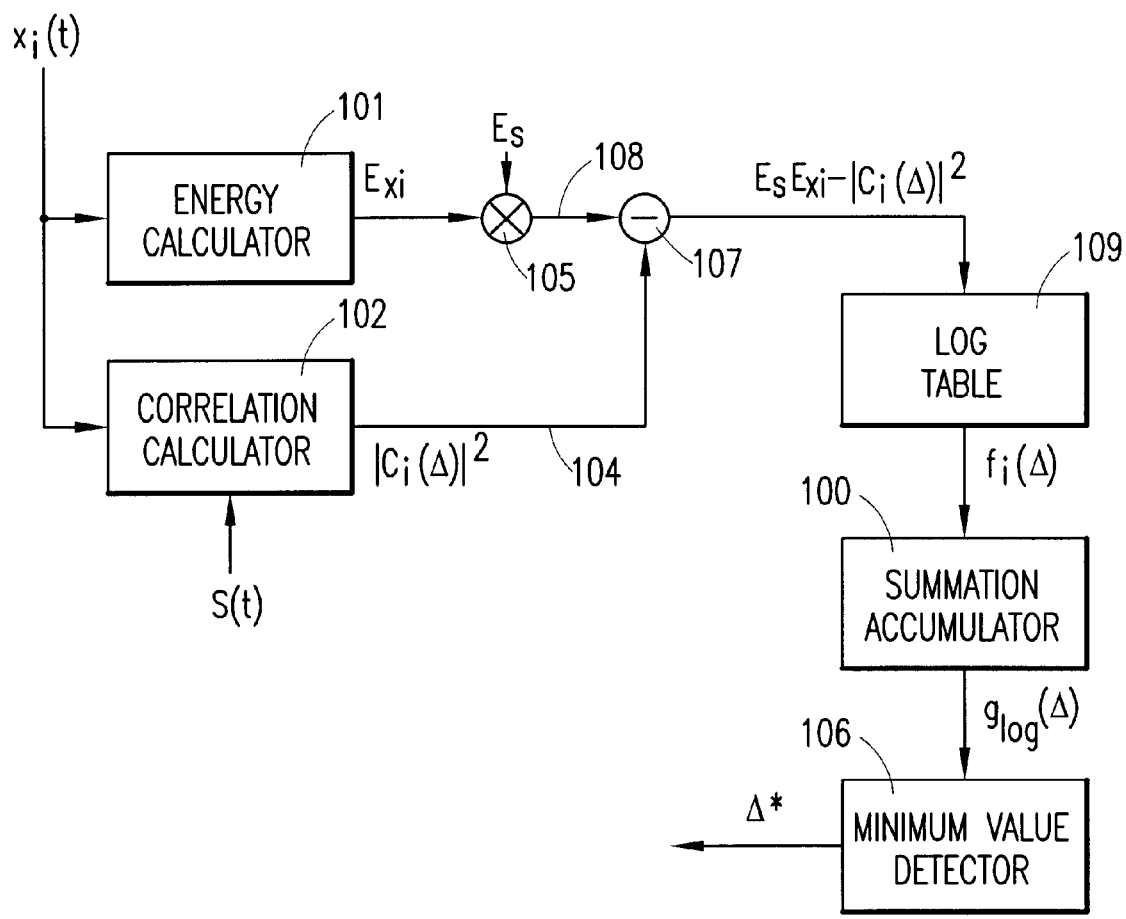
FIG. 10 illustrates an exemplary embodiment of the determiner of FIG. 9.

FIG. 10 diagrammatically illustrates an exemplary embodiment of the determiner 95 of FIG. 9. The received signal $x_i$ is input to an energy calculator 101 which calculates $E_{xi}$ using conventional techniques. The signal $x_i$ is also input to a correlation calculator 102 which also receives as input the actual known training sequence s(t) The correlation calculator 102 can use conventional techniques to output at 104 the square of the magnitude of the correlation function of Equation 2 for all selected values of $\Delta$. The energy $E_{xi}$ of the received signal $x_i$ is multiplied by the known energy $E_s$ of the known signal s(t) by multiplier 105. $E_s$ will be the same predetermined constant for all $g_{log}$ calculations, and can be easily provided or calculated in advance. At subtractor 107, the output 104 of the correlation calculator 102 is combined with the product, $E_s E_{xi}$, output at 108 from multiplier 105. The output of subtractor 107, $E_s E_{xi} - |C_i(\Delta)|^2$, is applied to a logarithm lookup table 109 (or any suitable apparatus for determining logarithms), which produces the desired function $f_i(\Delta)$ from Equation 5. This function is then applied to a summation accumulator 100 to produce the desired function $g_{log}(\Delta)$. Note from Equation 5 that, for example, after 10 bursts (i=10), $$g_{\log}(\Delta) = f_{10}(\Delta) + \sum_{i=1}^{9} f_i(\Delta).$$

Thus, for each additional received signal $x_i$, $g_{log}$ is easily calculated by summation accumulator 100, without storing any previously received signals $x_i$, by simply adding $f_i(\Delta)$ for the current signal $x_i$ to the accumulated sum of the $f_i$ values corresponding to the previously received signals $x_i$. A minimum value detector 106 receives $g_{log}(\Delta)$ from the summation accumulator 100, detects the minimum of the function $g_{log}(\Delta)$, and outputs the value $\Delta^*$ corresponding to the detected minimum (see, e.g., FIG. 8).

Figure 11:
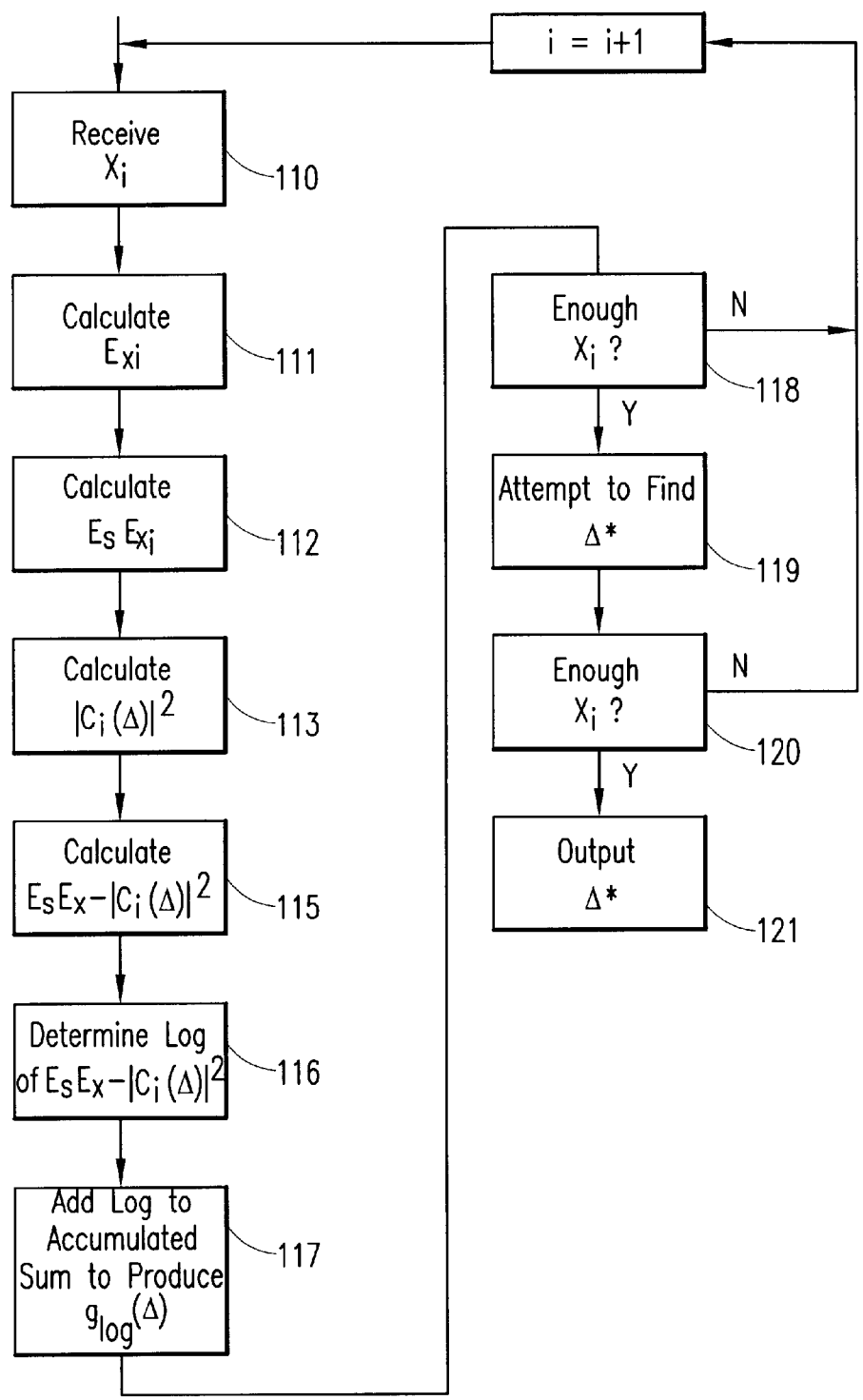
FIG. 11 illustrates exemplary operations which can be performed by the radio receiving station of FIGS. 9 and 10.

FIG. 11 illustrates exemplary operations which can be performed by the determiner of FIGS. 9 and 10. At 110, the current signal $x_i$ is received. At 111, the energy $E_{xi}$ is calculated. At 112, the energy $E_{xi}$ is multiplied by the known energy $E_s$. At 113, $|C_i(\Delta)|^2$ is calculated. At 115, the difference between $|C_i(\Delta)|^2$ and the energy product $E_s E_{xi}$ is determined. At 116, the logarithm of the difference (i.e., $f_i(\Delta)$) is determined. At 117, the logarithm is added to the accumulated sum of logarithms (corresponding to previously received signals $x_i$) to produce $g_{log}(\Delta)$.

It is determined at 118 whether enough signals $x_i$ have been processed to make an attempt to determine $\Delta^*$. If so, it is then attempted at 119 to find the minimum of $g_{log}(\Delta)$ and the corresponding $\Delta^*$. For example, if a predetermined nominal threshold number of signals $x_i$ have been processed, the attempt at 119 can be made. It is determined at 120 whether enough signals $x_i$ have been processed to provide confidence in the $\Delta^*$ determined at 119. If so, then $\Delta^*$ is output at 121. For example, $\Delta^*$ can be output at 121 if the determined minimum value of $g_{log}(\Delta)$ is considered to be distinguished clearly enough from the adjacent values of $g_{log}(\Delta)$, (e.g., differs from the adjacent values by more than a predetermined threshold amount). If it is determined at either 118 or 120 that not enough signals $x_i$ have yet been processed, then the next signal $x_i$ is awaited at 110. In this manner, $\Delta^*$ can be determined as soon as enough signals $x_i$ have arrived and been processed. In one example, the attempt at 119 might be made after 10 signals $x_i$ have been processed, but $\Delta^*$ might be output at 121 only after 50 signals $x_i$ have been processed.

Figure 12:
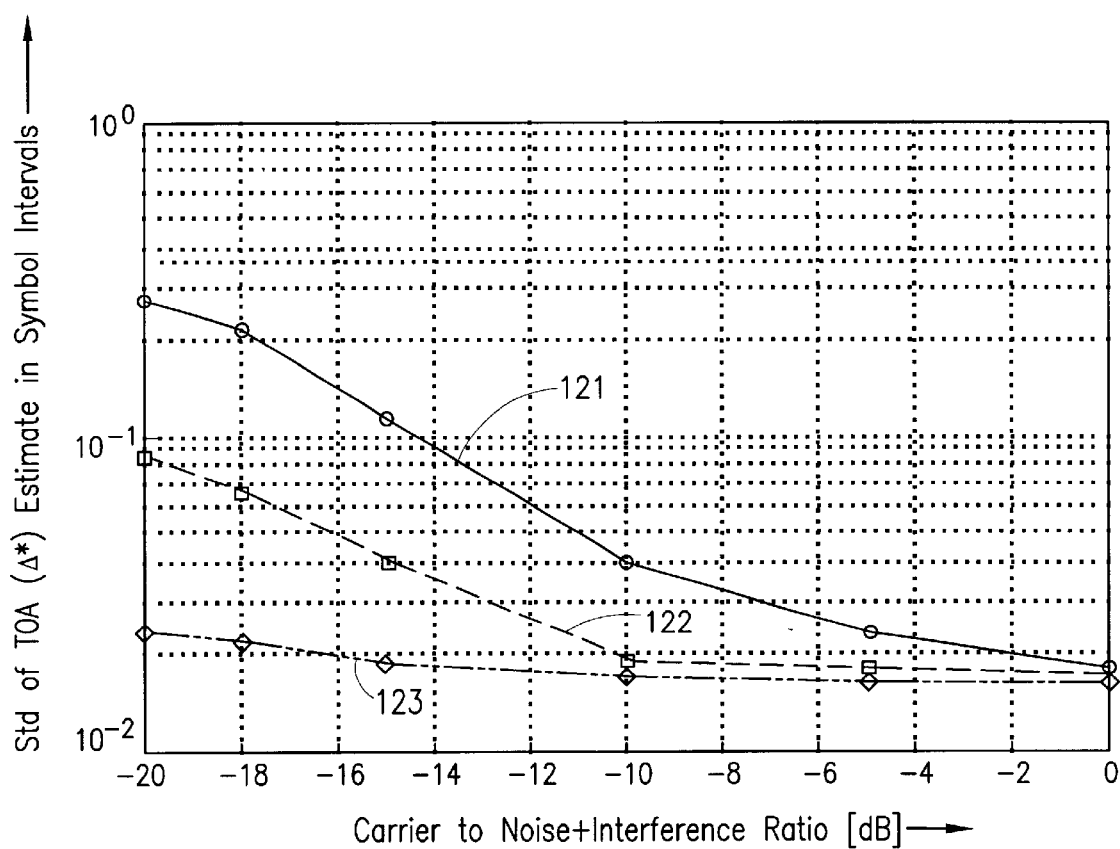
FIG. 12 graphically illustrates a comparison between exemplary prior art propagation time estimation techniques and an exemplary propagation time estimation technique according to the invention.

FIG. 12 illustrates graphically an exemplary comparison of estimating propagation time a using Equations 3, 4 and 5. The carrier SNIR is shown in dB on the horizontal axis, and the standard deviation (std) of the TOA estimate (i.e., the standard deviation of $\Delta^*$) is shown on the vertical axis in units of symbol intervals. The carrier and interference signal in this example simulation was a Binary Phase Shift Keying (BPSK) modulated sequence, propagated over independent flat Rayleigh fading channels. The number of bursts used was I=50. The results for Equations 3, 4 and 5 are shown respectively at 121, 122 and 123. The inventive technique of Equation 5 is clearly superior in this example, particularly at low SNIR levels.

It will be evident to workers in the art that the above-described invention can be readily implemented, for example, by suitable modifications in software, hardware or both in conventional time of arrival measurement/processing portions of conventional radio receiving stations.

Although exemplary embodiments of the present invention have been described above in detail, this does not limit the scope of the invention, which can be practiced in a variety of embodiments.

What is claimed is:

1. A method of determining a propagation time for propagation of a radio signal from a radio transmitting station to a radio receiving station, comprising:

the receiving station receiving a series of received signals that respectively correspond to radio signaling bursts transmitted by a radio transmitting station in a timewise periodic series so as to be offset from one another by a predetermined amount of time, each of said radio signaling bursts including a common signaling sequence that is known at the receiving station;

calculating for each received signal a plurality of correlation values indicative of correlation between the received signal and the known sequence for a plurality of possible values of the propagation time;

calculating an energy value of each received signal; and estimating the propagation time based on the calculated correlation values, the calculated energy values and a known energy value associated with the known sequence.

2. The method of claim 1, including using the estimated propagation time to determine a geographic position of one of the transmitting station and the receiving station.

3. The method of claim 1, wherein said estimating step includes, for each received signal, multiplying the calculated energy thereof by the known sequence energy to produce an energy product and, for each received signal, combining the energy product with the corresponding correlation values to produce combined values.

4. The method of claim 3, wherein said estimating step includes, for each received signal, determining logarithms of the corresponding combined values to produce logarithm values.

5. The method of claim 4, wherein said estimating step includes, for each of the plurality of possible values of the propagation time, summing the corresponding logarithm values of the received signals to produce a plurality of summation values respectively corresponding to the plurality of possible values of the propagation time.

6. The method of claim 5, wherein said estimating step includes identifying a smallest one of said summation values and identifying the corresponding propagation time value as the estimated propagation time.

7. The method of claim 4, wherein the estimating step includes summing the logarithm values of each received signal to the logarithm values of previously received signals.

8. The method of claim 3, wherein said combining step includes determining differences between the energy product and the respective correlation values to produce the combined values.

9. The method of claim 8, wherein said estimating step includes, for each received signal, determining logarithms of the corresponding combined values to produce logarithm values.

10. The method of claim 9, wherein said estimating step includes, for each of the plurality of possible values of the propagation time, summing the corresponding logarithm values of the received signals to produce a plurality of summation values respectively corresponding to the plurality of possible values of the propagation time.

11. The method of claim 10, wherein said estimating step includes identifying a smallest one of said summation values and identifying the corresponding propagation time value as the estimated propagation time.

12. The method of claim 3, wherein said step of calculating correlation values includes calculating, for each received signal, correlations between the received signal and the known sequence for the plurality of possible values of the propagation time, and squaring the magnitudes of the calculated correlations to produce the correlation values.

13. The method of claim 12, wherein said estimating step includes, for each received signal, determining logarithms of the corresponding combined values to produce logarithm values.

14. The method of claim 13, wherein said estimating step includes, for each of the plurality of possible values of the propagation time, summing the corresponding logarithm values of the received signals to produce a plurality of summation values respectively corresponding to the plurality of possible values of the propagation time.

15. The method of claim 14, wherein said estimating step includes identifying a smallest one of said summation values and identifying the corresponding propagation time value as the estimated propagation time.

16. An apparatus for determining a propagation time for propagation of a radio signal from a radio transmitting station to a radio receiving station, comprising:

a radio receiver for receiving a series of received signals which respectively correspond to radio signaling bursts transmitted by the radio transmitting station in a timewise periodic series so as to be timewise offset from one another by a predetermined amount of time, each of said radio signaling bursts including a common signaling sequence;

a determiner coupled to said radio receiver for receiving therefrom said received signals, said determiner having an input for receiving information indicative of said common sequence, said determiner including a correlation calculator responsive to said received information and said received signals for calculating, for each of said received signals, a plurality of correlation values indicative of correlation between the received signal and said common sequence for a plurality of possible values of the propagation time, said determiner further including an energy calculator for calculating an energy value of each received signal; and said determiner operable to estimate the propagation time based on the calculated correlation values, the calculated energy values and a known energy value associated with said common sequence.

17. The apparatus of claim 16, including an output coupled to said determiner for outputting to a mobile positioning application information indicative of the estimated propagation time.

18. The apparatus of claim 16, wherein the apparatus is provided in a mobile radio receiving station.

19. The apparatus of claim 16, wherein said determiner includes a multiplier coupled to said energy calculator for multiplying the calculated energy value of each received signal by said known energy value to produce an energy product, said determiner further including a combining apparatus coupled to said multiplier for combining the energy product of each received signal with the corresponding correlation values thereof to produce combined values.

20. The apparatus of claim 19, wherein said determiner further includes a logarithm determiner coupled to said combining apparatus for determining, in response to the combined values associated with each received signal, respectively corresponding logarithm values.

21. The apparatus of claim 20, wherein said determiner further includes a summing accumulator which is coupled to said logarithm determiner and which, for each of the plurality of possible values of the propagation time, sums the corresponding logarithm values of the received signals to produce a plurality of summation values respectively corresponding to the plurality of possible values of the propagation time.

22. The apparatus of claim 21, wherein said determiner includes a detector coupled to said summing accumulator for identifying a smallest one of said summation values and identifying the corresponding propagation time value as the estimated propagation time.

23. The apparatus of claim 20, wherein the determiner further includes an accumulator which is coupled to said logarithm determiner, said accumulator sums the logarithm values of each received signal to the logarithm values of previously received signals.

24. The apparatus of claim 16, wherein the apparatus is provided in a fixed-site radio receiving station.

\* \* \* \* \*